US012311475B2

(12) United States Patent
Manjon Fernandez et al.

(10) Patent No.: US 12,311,475 B2
(45) Date of Patent: May 27, 2025

(54) WELDING FLUX COMPOSITION AND CORRESPONDING METHOD FOR WELDING METALS

(71) Applicant: VERDICIO SOLUTIONS A.I.E., Madrid (ES)

(72) Inventors: Alvaro Manjon Fernandez, Oviedo Asturias (ES); Marcos Perez Rodriguez, Cangas del Narcea Asturias (ES); Christopher Gerritsen, Sint-Amandsberg (BE)

(73) Assignee: VERDICIO SOLUTIONS A.I.E., Madrid (ES)

( * ) Notice: Subject to any disclaimer, the term of this patent is extended or adjusted under 35 U.S.C. 154(b) by 0 days.

(21) Appl. No.: 18/031,518

(22) PCT Filed: Oct. 21, 2020

(86) PCT No.: PCT/IB2020/059871
§ 371 (c)(1),
(2) Date: Apr. 12, 2023

(87) PCT Pub. No.: WO2022/084716
PCT Pub. Date: Apr. 28, 2022

(65) Prior Publication Data
US 2023/0405734 A1    Dec. 21, 2023

(51) Int. Cl.
*B23K 35/36* (2006.01)
*B23K 35/02* (2006.01)
*B23K 103/04* (2006.01)

(52) U.S. Cl.
CPC ...... *B23K 35/3608* (2013.01); *B23K 35/0255* (2013.01); *B23K 35/3602* (2013.01); *B23K 2103/04* (2018.08)

(58) Field of Classification Search
CPC ............ B23K 35/3608; B23K 35/0255; B23K 2103/04; B23K 35/362; B23K 35/3602; B23K 9/18
See application file for complete search history.

(56) References Cited

U.S. PATENT DOCUMENTS

| 3,588,432 | A | | 6/1971 | Arnoldy et al. |
| 3,627,574 | A | | 12/1971 | DeLong et al. |
| 4,314,136 | A | | 2/1982 | Kotecki et al. |
| 4,723,060 | A | * | 2/1988 | Arnoldy ............. B23K 9/324 219/73 |
| 6,339,209 | B1 | | 1/2002 | Kotecki et al. |
| 6,664,508 | B1 | * | 12/2003 | Johnson ............. B23K 35/362 219/136 |
| 2004/0009300 | A1 | | 1/2004 | Shimakura et al. |
| 2006/0219685 | A1 | | 10/2006 | Karogal et al. |
| 2013/0299460 | A1 | | 11/2013 | Wu et al. |
| 2014/0124482 | A1 | | 5/2014 | Katiyar et al. |
| 2015/0336219 | A1 | * | 11/2015 | Bruck ............... B23K 10/027 428/570 |

FOREIGN PATENT DOCUMENTS

| BE | 754889 A | 1/1971 |
| CA | 2535145 A1 | 12/2006 |
| EP | 1537940 A1 | 6/2005 |
| EP | 1698428 A1 | 9/2006 |
| EP | 1710042 A1 | 10/2006 |
| EP | 1710043 A1 | 10/2006 |
| GB | 1 336182 A | 11/1973 |
| JP | 2006289494 A | 10/2006 |
| WO | WO0016940 | 3/2000 |
| WO | WO 0059674 A1 | 10/2000 |
| WO | WO 2009/086193 A2 | 7/2009 |
| WO | WO 2020/212735 A1 | 10/2020 |
| WO | WO 2020212885 A1 | 10/2020 |
| WO | WO 2022/084716 A1 | 4/2022 |
| WO | WO 2022/084717 A1 | 4/2022 |
| WO | WO 2022/084718 A1 | 4/2022 |
| WO | WO 2022/084719 A1 | 4/2022 |
| WO | WO 2022084720 A1 | 4/2022 |

OTHER PUBLICATIONS

Search Report of PCT/IB2020/059876 of Nov. 12, 2020 and International Report on Patentability.
Search Report of PCT/IB2020/059872 of Jun. 22, 2021 and International Report on Patentability.
Search Report of PCT/IB2020/059874 of Aug. 7, 2021 and International Report on Patentability.

(Continued)

Primary Examiner — Jeffrey T Carley
Assistant Examiner — Dilnessa B Belay
(74) Attorney, Agent, or Firm — Davidson Kappel LLC

(57) ABSTRACT

A method for the manufacture of a welded joint including the following successive steps: I. The provision of at least two metallic substrates wherein at least one metallic substrate is a steel substrate, and II. The welding of the at least two metallic substrates with a welding head while, simultaneously, applying on the at least two metallic substrates, ahead of the welding head, a welding flux including a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof.

12 Claims, No Drawings

(56) References Cited

OTHER PUBLICATIONS

Search Report of PCT/IB2020/059875 of Jun. 22, 2021 and International Report on Patentability.
Search Report of PCT/IB2020/059871 of Jun. 7, 2021 and International Report on Patentability.
Balos Sebastian et al, "Metal Oxide Nanoparticle-Based Coating as a Catalyzer for A-TIG Welding: Critical Raw Material Perspective", Metals, (May 15, 2019), vol. 9, No. 5, doi:10.3390/met9050567, p. 567.

* cited by examiner

WELDING FLUX COMPOSITION AND CORRESPONDING METHOD FOR WELDING METALS

The present invention relates to the welding of metallic substrates with welding fluxes. It is particularly well suited for construction, shipbuilding, transportation industry (rail and automotive), energy-related structures, oil&gas and offshore industries.

BACKGROUND

It is well known to weld metallic substrates with different welding techniques such as Gas Metal Arc Welding (GMAW), Gas Tungsten Arc Welding (GTAW) also known as Tungsten Inert Gas Welding (TIGW), Submerged Arc Welding (SAW), Laser Beam Welding (LBW), Narrow Gap Welding, also known as narrow groove welding, laser arc hybrid welding. The welding can be done with the help of a welding flux for increasing penetration in the substrates. This welding flux differs from a possible shielding flux mainly used to protect the welded zone from oxidation during welding.

The patent application WO00/16940 discloses that deep penetration gas tungsten arc welds are achieved using titanates such as $Na_2Ti_3O_7$ or $K_2TiO_3$. Titanate is applied to the weld zone as part of a welding flux or as part of a filler wire to afford deep penetration welds in carbon steels, chrome-molybdenum steels, stainless steels as well as nickel-based alloys. The titanate compounds of WO00/16940 are used in the form of high-purity powders of about 325 mesh or finer, 325 mesh corresponding to 44 μm. To control arc wander, bead consistency, and slag and surface appearance of the weldments, various additional components may be optionally added to the titanate-based filler wire, including transition metal oxides such as $TiO$, $TiO_2$, $Cr_2O_3$, and $Fe2O_3$, silicon dioxide, manganese silicides, fluorides and chlorides. All compounds of the flux have micrometric dimensions.

SUMMARY OF THE INVENTION

Although the penetration is improved with the flux discloses in WO00/16940, the penetration is not optimum for steel substrates.

There is thus a need for improving the weld penetration in steel substrates and therefore the mechanical properties of welded steel substrates. There is also a need for increasing the deposition rate and productivity of the welding.

To this end, the invention relates to a method for the manufacture of a welded joint comprising the following successive steps:

I. The provision of at least two metallic substrates wherein at least one metallic substrate is a steel substrate, and
II. The welding of the at least two metallic substrates with a welding head while, simultaneously, applying on the at least two metallic substrates, ahead of the welding head, a welding flux comprising a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof.

The method according to the invention may also have the optional features listed below, considered individually or in combination:

- the titanate is chosen from among: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ or mixtures thereof,
- the thickness of the welding flux is between 10 to 140 μm,
- the percentage of the nanoparticulate oxide in the welding flux is below or equal to 80 wt. %,
- the percentage of the nanoparticulate oxide in the welding flux is above or equal to 10 wt. %,
- the nanoparticles have a size comprised between 5 and 60 nm,
- the percentage of titanate in the welding flux is above or equal to 45 wt. %,
- the diameter of the titanate is between 1 and 40 μm,
- the welding flux is applied with a flux hopper,
- a shielding flux is further applied on the at least two metallic substrates, ahead of the welding head, simultaneously with the welding, so that the shielding flux covers the welding flux,
- the shielding flux is applied with a flux hopper,
- the welding flux is also a shielding flux,
- the welding flux further comprises lime, silica, manganese oxide and calcium fluoride in the form of particles of micrometric and/or millimetric size,
- the welding is done by Submerged Arc Welding, Narrow Gap Welding based on Submerged Arc Welding or Laser Arc Hybrid Welding based on Submerged Arc Welding.

The invention also relates to a welding equipment comprising a welding head, a first flux hopper positioned ahead of the welding head and suitable for the application of a shielding flux and a second flux hopper suitable for the application of a welding flux and positioned further ahead of the welding head than the first flux hopper.

DETAILED DESCRIPTION

The following terms are defined:

Nanoparticles are particles between 1 and 100 nanometers (nm) in size.

Titanate refers to inorganic compounds containing titanium, oxygen and at least one additional element, such as an alkali metal element, alkaline-earth element, transition metal element or metallic element. They can be in the form of their salts.

Without willing to be bound by any theory, it is believed that the welding flux according to the invention mainly modifies the melt pool physics. It seems that, in the present invention, not only the nature of the compounds, but also the size of the oxide particles being equal to or below 100 nm modifies the melt pool physics.

Indeed, the flux is melted and incorporated in the molten metal in the form of dissolved species and, if the welding technique involves an arc, in the arc in the form of ionized species. Thanks to the presence of titanate and oxide nanoparticles in the arc, the arc is constricted.

Moreover, the flux dissolved in the molten metal modifies the Marangoni flow, which is the mass transfer at the liquid-gas interface due to the surface tension gradient. In particular, the components of the flux modify the gradient of surface tension along the interface. This modification of surface tension results in an inversion of the fluid flow towards the center of the weld pool. This inversion leads to improvements in the weld penetration and in the welding efficiency leading to an increase in deposition rate and thus in productivity. Without willing to be bound by any theory, it is believed that the nanoparticles dissolve at lower temperature than microparticles and therefore more oxygen is dissolved in the melt pool, which activate the reverse Marangoni flow.

When the welding technique involves an arc, the effect of the reverse Marangoni flow combines with a higher plasma temperature due to arc constriction, which further improves the weld penetration and the material deposition rate. When the welding technique involves a laser beam, the reverse Marangoni flow contributes to the retention of a proper keyhole shape, which, in turn, prevents gas entrapment and thus pores in the weld.

Furthermore, the dissolved oxygen acts as a surfactant, improving the wetting of the molten metal on the base metal and therefore avoiding critical defects prone to appear in the weldment, such as lack of edge fusion.

Moreover, as the components of the flux make the surface tension increase with temperature, the wettability of the weld material increases along the edges which are colder than the center of the melt pool, which prevents slag entrapment.

The invention will be better understood by reading the following description, which is provided purely for purposes of explanation and is in no way intended to be restrictive.

The invention relates to the welding of a steel substrate. Preferably, the steel substrate is carbon steel.

The steel substrate can optionally be coated on at least part of one of its sides by an anti-corrosion coating. Preferably, the anti-corrosion coating comprises a metal selected from the group consisting of zinc, aluminium, copper, silicon, iron, magnesium, titanium, nickel, chromium, manganese and their alloys.

In a preferred embodiment, the anti-corrosion coating is an aluminium-based coating comprising less than 15 wt. % Si, less than 5.0 wt. % Fe, optionally 0.1 to 8.0 wt. % Mg and optionally 0.1 to 30.0 wt. % Zn, the remainder being Al and the unavoidable impurities resulting from the manufacturing process. In another preferred embodiment, the anti-corrosion coating is a zinc-based coating comprising 0.01-8.0 wt. % Al, optionally 0.2-8.0 wt. % Mg, the remainder being Zn and the unavoidable impurities resulting from the manufacturing process.

The anti-corrosion coating is preferably applied on both sides of the steel substrate.

The steel material can be welded to a steel substrate of the same composition or of a different composition. It can also be welded to another metal, such as for example, aluminium.

The welding flux comprises a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof. In other words, the welding flux comprises a titanate and at least one nanoparticulate oxide, wherein the at least one nanoparticulate oxide is selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof. This means that the welding flux doesn't comprise any other nanoparticulate oxide than the ones listed.

The titanate is selected from the group of titanates consisting of alkali metal titanates, alkaline-earth titanates, transition metal titanates, metal titanates and mixtures thereof. The titanate is more preferably chosen from among: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ and mixtures thereof. It is believed that these titanates further increase the penetration depth based on the effect of the reverse Marangoni flow. It is the inventors understanding that all titanates behave, in some measure, similarly and increase the penetration depth. All titanates are thus part of the invention. The person skilled in the art will know which one has to be selected depending on the specific case. To do so, he will take into account how easily the titanates melt and dissolve, how much they increase the dissolved oxygen content, how the additional element of the titanate affects the melt pool physics and the microstructure of the final weld. For example, $NaTiO_7$ is favored due to the presence of Na that improves the slag formation and detachment.

Preferably, the titanate has a diameter between 1 and 40 µm, more preferably between 1 and 20 µm and advantageously between 1 and 10 µm. It is believed that this titanate diameter further improves the arc constriction and the reverse Marangoni effect. Moreover, having small micrometric titanate particles increases the specific surface area available for the mix with the nanoparticulate oxides and have the latter further adhere to the titanate particles.

Preferably, the percentage in weight of the titanate in dry weight of welding flux is above or equal to 45%, more preferably between 45% and 90% and even more preferably between 65% and 90%.

The nanoparticulate oxide is chosen from $TiO_2$, $SiO_2$, $ZrO_2$, $Y_2O_3$, $Al_2O_3$, $MoO_3$, $CrO_3$, $CeO_2$, $La_2O_3$ and mixtures thereof. These nanoparticles dissolve easily in the melt pool, provide oxygen to the melt pool and, consequently, improve the wettability and the material deposition and allow for a deeper weld penetration.

Contrary to other oxides, such as CaO, MgO, $B_2O_3$, $Co_3O_4$ or $Cr_2O_3$, they do not tend to form brittle phases, they do not have a high refractory effect that would prevent the heat from correctly melting the steel and their metal ions do not tend to recombine with oxygen in the melt pool.

Preferably, the nanoparticles are $SiO_2$ and $TiO_2$, and more preferably a mixture of $SiO_2$ and $TiO_2$. It is believed that $SiO_2$ mainly increases the penetration depth and eases the slag removal while $TiO_2$ mainly increases the penetration depth and forms Ti-based inclusions which improve the mechanical properties.

Other examples of mixtures of nanoparticulate oxides are:
Yttria-stabilized zirconia (YSZ) which is a ceramic in which the cubic crystal structure of zirconium dioxide ($ZrO_2$) is made stable at room temperature by an addition of yttrium oxide ($Y_2O_3$),
A 1:1:1 combination of $La_2O_3$, $ZrO_2$ and $Y_2O_3$, which helps adjusting the refractory effect and promote the formation of inclusions.

Preferably, the nanoparticles have a size comprised between 5 and 60 nm. it is believed that this nanoparticles diameter further improves the homogeneous distribution of the flux.

Preferably, the percentage in weight of the nanoparticulate oxide in dry weight of welding flux is below or equal to 80%, preferably above or equal to 10%, more preferably between 10 and 60%, even more preferably between 25 and 55%.

According to one variant of the invention, the flux consists of a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof.

According to another variant of the invention, the welding flux further comprises microparticulate compounds, such as microparticulate oxides and/or microparticulate fluorides, such as, for example, $Na_2O$, $Na_2O_2$, $CeO_2$, $NaBiO_3$, NaF, $CaF_2$, cryolite ($Na_3AlF_6$). Moving from nanoparticles to microparticles for some of the nanoparticulate oxides listed above alleviate the health and safety concerns related to the use of some of these oxides during the manufacturing of the wire. $Na_2O$, $Na_{2O2}$, $NaBiO_3$, NaF, $CaF_2$, cryolite can be added to improve the slag formation so that slag entrapment is further prevented. They also help forming an easily detachable slag. The flux can comprise from 0.1 to 5 wt %, in dry weight of welding flux, of $Na_2O$, $Na_2O_2$, $NaBiO_3$, NaF, $CaF_2$, cryolite and mixtures thereof.

In term of process, in a first step, the titanate and nanoparticulate oxide are preferably mixed. It can be done either in wet conditions with a solvent such as acetone or in dry conditions for example in a 3D powder shaker mixer. The mixing favors the aggregation of the nanoparticles on the titanate particles which prevents the unintentional release of nanoparticles in the air, which would be a health and safety issue.

The welding flux thus obtained is then applied directly on the metallic substrates during the welding, in particular to the weld zone.

In particular, while the two metallic substrates are welded, the welding flux is simultaneously applied at least partially on the two metallic substrates. The welding flux is applied ahead of the welding equipment, in particular ahead of the welding head. Welding head refers here to the electrode, either consumable or not, which creates an arc or to the laser head, depending on the welding technique. This way the components of the welding flux are melted and dissolved in the melt pool when the energy applied through the welding head hits the portion of substrate covered with the welding flux. The dissolved titanate and nanoparticulate oxide have the effects presented above.

The welding flux is preferably applied on a portion of the metallic substrate just before this portion is hit by the energy applied through the welding head.

Preferably, the welding flux is applied along the edges of the metallic substrates to be welded on a width at least equal to the weld width, so that the welding flux is efficiently dissolved in the melt pool.

Preferably, the thickness of the applied welding flux is between 10 to 140 µm.

Preferably, the welding flux is stored in a flux hopper. This hopper is positioned ahead of the welding equipment, in particular ahead of the welding head, and moves along with it. During welding, the hopper deposits the welding flux on a small portion of the metallic substrates ahead of the welding head. The flux hopper controls the rate of flux deposition.

In one variant of the invention, the welding flux is applied on the two metallic substrates before applying a shielding flux. Ahead of the welding head, there is first the flux hopper stocking the shielding flux and then the flux hopper stocking the welding flux. In other words, the welding flux hopper is further ahead of the welding head than the shielding flux hopper. Consequently, the welding flux is applied in the first place on the metallic substrates and the shielding flux is applied in the second place so that it covers the welding flux. The welded zone is thus protected from oxidation during welding. From a process perspective, the application of the welding flux and the application of the shielding flux are both simultaneous with the welding.

In another variant of the invention, the welding flux is also a shielding flux. It preferably further comprises lime, silica, manganese oxide and calcium fluoride in the form of particles of micrometric and/or millimetric size. These compounds provide the shielding effect to the flux in addition to the effects provided by the titanate and nanoparticulate oxide. The welded zone is thus protected from oxidation during welding.

In that case, the titanate and nanoparticulate oxide are mixed with additional components, such as lime, silica, manganese oxide and calcium fluoride in the form of particles of micrometric and/or millimetric size at an earlier stage and the mixture is then applied on the two metallic substrates, preferably with a flux hopper.

The kind of welding technique to be used is not limited. It can be, for example, Gas Metal Arc Welding (GMAW), Gas Tungsten Arc Welding (GTAW) also known as Tungsten Inert Gas Welding (TIGW), Submerged Arc Welding (SAW), Laser Beam Welding (LBW), Narrow Gap Welding, also known as narrow groove welding or Laser Arc Hybrid welding.

That said, the variant where the welding flux is also a shielding flux is particularly advantageous for the welding techniques using shielding fluxes, such as Submerged Arc Welding (SAW), Narrow Gap Welding based on Submerged Arc Welding and Laser Arc Hybrid Welding based on Submerged Arc Welding.

The invention also relates to the welding equipment designed so that two fluxes can be applied one after the other ahead of the welding head.

This equipment comprises a welding head, a first flux hopper positioned ahead of the welding head and suitable for the application of a shielding flux and a second flux hopper suitable for the application of a welding flux and positioned further ahead of the welding head than the first flux hopper so that the welding flux is applied first and is covered by the shielding flux.

Preferably, the welding flux comprises a titanate and a microparticulate oxide.

More preferably, the welding flux comprises a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof.

Finally, the invention relates to the use of a flux according to the present invention for the manufacture, for example, of pressure vessels, offshore and oil & gas components, shipbuilding, automotive, nuclear components and heavy industry & manufacturing in general.

Example 1

The effect of different welding fluxes on the welding of steel substrates was assessed by Finite Element Method (FEM) simulations. In the simulations, the fluxes comprise nanoparticulate oxides having a diameter of 10-50 nm and optionally $MgTiO_3$ (diameter: 2 µm). Arc welding with each flux was simulated and the results are in the following Table 1:

| | Coating composition (wt. %) | | | | |
|---|---|---|---|---|---|
| Sample | titanate | | nanoparticles | | Results |
| 1* | 50% $MgTiO_3$ | 40% $TiO_2$ | 10% YSZ | — | Homogeneous thermal profile. No formation of brittle phases. Maximum temperature in the middle of the steel. Full penetration |

-continued

| | Coating composition (wt. %) | | | | |
|---|---|---|---|---|---|
| Sample | titanate | nanoparticles | | | Results |
| 2* | 50% MgTiO$_3$ | 15% TiO$_2$ | 35% Al$_2$O$_3$ | — | Homogeneous thermal profile. No formation of brittle phases. Maximum temperature in the middle of the steel. Full penetration |
| 3* | 50% MgTiO$_3$ | 15% TiO$_2$ | 35% MoO$_3$ | — | Homogeneous thermal profile. No formation of brittle phases. Maximum temperature in the middle of the steel. Full penetration |
| 4* | 50% MgTiO$_3$ | 15% TiO$_2$ | 35% CrO$_3$ | — | Homogeneous thermal profile. No formation of brittle phases. Maximum temperature in the middle of the steel. Full penetration |
| 5 | 50% MgTiO$_3$ | 15% TiO$_2$ | 35% CaO | — | High refractory effect of CaO. Arc heat in the surface of the plate. No full penetration |
| 6 | 50% MgTiO$_3$ | 15% TiO$_2$ | 35% MgO | — | High refractory effect of MgO. Arc heat in the surface of the plate. No full penetration |
| 7* | 50% MgTiO$_3$ | 15% TiO$_2$ | 35% CeO$_2$ | — | Homogeneous thermal profile. No formation of brittle phases. Maximum temperature in the middle of the steel. Full penetration |
| 8 | 50% MgTiO$_3$ | 15% TiO$_2$ | 35% B$_2$O$_3$ | — | Maximum arc heat in the surface of the steel. No full penetration. Formation of brittle phases |
| 9* | 70% MgTiO$_3$ | 10% SiO$_2$ | 20% CeO$_2$ | — | Homogeneous thermal profile. No formation of brittle phases. Maximum temperature in the middle of the steel. Full penetration |
| 10 | 70% MgTiO$_3$ | 30% Cr$_2$O$_3$ | | — | Maximum arc heat in the surface of the steel. No full penetration. Formation of brittle phases |
| 11 | 0 | 20% MgO | 70% Co$_3$O$_4$ | 10% SiO$_2$ | High refractory effect of MgO and Co$_3$O$_4$. Arc heat in the surface of the plate. No full penetration |
| 12 | 0 | 20% MoO$_3$ | 70% CeO$_2$ | 10% SiO$_2$ | No effect of the flux. No full penetration |
| 13 | 70% MgTiO$_3$ | 30% TiN | | — | No effect of the flux. No full penetration |

*according to the present invention

Results show that the fluxes according to the present invention improve the penetration and the quality of the welds compared to comparative fluxes.

What is claimed is:

1. Method for the manufacture of a welded joint comprising the following successive steps: providing at least two metallic substrates wherein a first of the at least two metallic substrates is a steel substrate; and welding the at least two metallic substrates with a welding head while, simultaneously, applying on the at least two metallic substrates, ahead of the welding head, a welding flux including a titanate and a nanoparticulate oxide selected from the group consisting of TiO$_2$, SiO$_2$, ZrO$_2$, Y$_2$O$_3$, Al$_2$O$_3$, MoO$_3$, CrO$_3$, CeO$_2$, La$_2$O$_3$ and mixtures thereof, wherein the nanoparticles have a diameter between 5 and 60 nm; and wherein a diameter of the titanate is between 1 and 40 µm.

2. The method as recited in claim 1 wherein the titanate is chosen from the group consisting of: Na$_2$Ti$_3$O$_7$, NaTiO$_3$, K$_2$TiO$_3$, K$_2$Ti$_2$O$_5$, MgTiO$_3$, SrTiO$_3$, BaTiO$_3$, CaTiO$_3$, FeTiO$_3$ and ZnTiO$_4$ or mixtures thereof.

3. The method as recited in claim 1 wherein a thickness of the welding flux is between 10 to 140 µm.

4. The method as recited in claim 1 wherein a percentage of the nanoparticulate oxide in the welding flux is below or equal to 80 wt. %.

5. The method as recited in claim 1 wherein a percentage of the nanoparticulate oxide in the welding flux is above or equal to 10 wt. %.

6. The method as recited in claim 1 wherein a percentage of titanate in the welding flux is above or equal to 45 wt. %.

7. The method as recited in claim 1 wherein the welding flux is applied with a flux hopper.

8. The method as recited in claim 1 further comprising applying a shielding flux on the at least two metallic substrates, ahead of the welding head, simultaneously with the welding, so that the shielding flux covers the welding flux.

9. The method as recited in claim 8 wherein the shielding flux is applied with a flux hopper.

10. The method as recited in claim 1 wherein the welding flux is also a shielding flux.

11. The method as recited in claim 1 wherein the welding flux further includes lime, silica, manganese oxide and calcium fluoride in the form of particles of micrometric or millimetric size.

12. The method as recited in claim 1 wherein the welding is done by Submerged Arc Welding, Narrow Gap Welding based on Submerged Arc Welding or Laser Arc Hybrid Welding based on Submerged Arc Welding.

* * * * *